United States Patent [19]

Neff et al.

[11] Patent Number: 5,685,214
[45] Date of Patent: Nov. 11, 1997

[54] ACTUATOR FOR TRANSLATIONAL AND ROTARY MOVEMENT

[75] Inventors: Edward A. Neff, Rancho Santa Fe; Hans Porteguise, Temecula, both of Calif.

[73] Assignee: Systems, Machines, Automation Components Corporation, Carlsbad, Calif.

[21] Appl. No.: 620,504

[22] Filed: Mar. 22, 1996

[51] Int. Cl.⁶ ............................. F01B 3/00; H01K 41/00
[52] U.S. Cl. ................................... 92/31; 310/12
[58] Field of Search ................... 91/61, 1; 92/DIG. 1, 92/DIG. 2, 31, 165 R; 310/12, 13, 14

[56] References Cited

U.S. PATENT DOCUMENTS

| | | |
|---|---|---|
| 3,200,426 | 8/1965 | Barr ............................ 92/31 X |
| 3,272,347 | 9/1966 | Lemelson . |
| 3,483,932 | 12/1969 | Jaulmes ........................ 91/61 X |
| 4,510,683 | 4/1985 | Fedde et al. . |
| 4,563,908 | 1/1986 | Shube . |
| 4,653,794 | 3/1987 | Atlas . |
| 4,759,124 | 7/1988 | Snyder et al. . |
| 4,864,880 | 9/1989 | Grant et al. . |
| 4,913,613 | 4/1990 | Hirschmann . |
| 5,055,725 | 10/1991 | LaSota ............................ 310/12 X |
| 5,175,456 | 12/1992 | Neff et al. . |
| 5,210,933 | 5/1993 | Miyanishi et al. . |
| 5,315,189 | 5/1994 | Neff et al. . |
| 5,317,222 | 5/1994 | Neff et al. . |
| 5,446,323 | 8/1995 | Neff et al. . |

*Primary Examiner*—Hoang Nguyen
*Attorney, Agent, or Firm*—Nydegger & Associates

[57] ABSTRACT

A mechanism for precise translational positioning of a rotatable rod includes a reciprocating piston. A rotary motor is mounted on the piston for establishing rotation about a first axis, and a flexible coupling connects the rotary motor with a rod for precise rotation of the rod about an axis substantially parallel to the first axis. Further, the mechanism includes a pair of roller bearings. These roller bearings are distanced from each other, and each interconnect the rotatable rod with the reciprocating piston to permit rotation of the rod relative to the piston while preventing translation relative thereto. Additionally, a sleeve with a pair of O-rings is mounted to the rod between the pair of roller bearings to create a fluid chamber between the O-rings, the rod, and the piston. A fluid passageway in the rod then allows a vacuum pump to draw a vacuum from the chamber to the distal end of the rod.

15 Claims, 2 Drawing Sheets

ACTUATOR FOR TRANSLATIONAL AND ROTARY MOVEMENT

FIELD OF THE INVENTION

The present invention pertains generally to machines which are useful for the automated assembly of products. More specifically, the present invention pertains to electric motors which are useful for inspecting, assembling and positioning component parts in a product assembly process. The present invention is particularly, but not exclusively, useful as an actuator for the quick movement and precise positioning of relatively fragile component parts during an automated assembly procedure while generating both extremely light forces and normal forces on the component parts.

BACKGROUND OF THE INVENTION

Numerous devices which are useful for the automated assembly of products have been successfully used for many years. In each instance, automated assembly devices have been employed with a view toward increasing the efficiencies and accuracies of the methods, procedures and processes which are followed during the manufacture and the assembly of a completed product. Indeed, the vast majority of consumer products are now manufactured on assembly lines which incorporate automated assembly devices.

It is easy to appreciate that as the complexity of a manufactured product increases, there may also be a commensurate increase in the complexity of the machines that are required to manufacture the product. This is particularly so where the component parts are delicate or fragile and precision assembly is important. For example, many products require the precise positioning and assembly of extremely small and light weight components in their manufacture. More specifically, these operations require precision in both the movement of the component into position and in the force with which the component is moved and assembled with other components. Where very small, fragile or light weight components are being used in the manufacturing process, and where either very light forces or normal forces are required for the assembly of these components these considerations become very important.

One type of device that is useful for automated assembly is the linear voice coil actuator. Actuators of this type may be used to move and position assembly components and offer a unique combination of compact design, light action handling and high precision movement. In general, this combination of features is not attainable using more traditional designs such as solenoids, stepper motors or pneumatic devices. For these reasons, the voice coil actuator is becoming an increasingly popular component in design and construction of automated assembly apparatus.

Structurally, linear voice coil actuators generally include an electromagnetic coil slidingly mounted to move translationally along an axis of displacement through the fixed magnetic field of a permanent magnet. Electric current applied to the electromagnetic coil causes the coil to generate a variable magnetic field and the interaction of the variable magnetic field and the fixed magnetic field moves the coil translationally along the axis of displacement. The polarity and magnitude of the variable magnetic field generated by the electromagnetic coil, and, consequently the force generated by the coil and the direction of movement along the axis of displacement may be controlled by appropriate adjustments to the electric current.

For the purposes of automated assembly, a manipulator is generally attached to move translationally with the coil. In operation, the manipulator grasps an assembly component and electric current is applied to the coil to cause the coil and manipulator to move or otherwise reposition the component along the axis of displacement. When the component has reached the desired destination, the manipulator releases the component allowing the process to be repeated for additional components.

To provide rotational movement in addition to the translational movement just described, a linear voice coil may incorporate a manipulator that is rotatable around the actuator's axis of displacement. The manipulator is connected to a servo-motor so that current applied to the servo-motor causes the manipulator to selectively rotate. Practice has shown that it is particularly efficient to locate the manipulator and the servo-motor along a common axis of rotation and flexibly couple the output shaft of the servo-motor with the manipulator. Functionally, the inclusion of the flexible coupling provides a means whereby small variations in rotational alignment between the manipulator and the servomotor may be attenuated. A linear voice coil which includes these basic elements is disclosed in U.S. Pat. No. 5,315,189 which issued to Neff for an invention entitled "Actuator with Translational and Rotational Control," and which is assigned to the same assignee as the present invention.

The use of actuators which include direct drive servo-motors for rotational control has not been without problem. Specifically, practice has demonstrated that such actuators generally exhibit a lower degree of translational accuracy when compared with actuators that provide translational movement alone. The decrease in translational accuracy is generally attributable to the flexible coupling between the direct-drive servo-motor and the manipulator. It may be appreciated that during translational movement of the manipulator, there is a tendency for the flexible coupling to undergo forces which tend to alternately compress and elongate the coupling. In turn, the compression and elongation of the flexible coupling results in some degree of variation in the translational position of the manipulator.

Another problem associated with the use of servo-motors to provide rotational control for linear voice coil actuators involves the transfer of unwanted forces and impacts to the servo-motor. Specifically, as the electromagnetic coil accelerates and decelerates, or moves to grasp or otherwise contact assembly components, a force, or thrust, is directed along the translational direction of movement. In traditional actuator designs, this force or thrust is transferred to the servo-motor where it may result in unwanted wear and possible degradation of the servo-motor.

In light of the above, it is an object of the present invention to provide an actuator for transporting and positioning assembly components which provides precision translational and rotational movement. It is another object of the present invention to provide an actuator for transporting and positioning assembly components which features enhanced operational durability. Still another object of the present invention is to provide an actuator for transporting and positioning assembly components which is relatively simple to use, is relatively easy to manufacture and is comparatively cost effective.

SUMMARY OF THE PREFERRED EMBODIMENTS

An actuator for transporting and positioning assembly components is provided. More specifically, the actuator provides for translational movement of components along an axis of displacement and for rotational movement of components around the same axis.

The actuator includes a piston slidingly mounted within a housing for translational movement in parallel with the axis of displacement. A permanent magnet is mounted to the housing and establishes a fixed magnetic field within the housing. The permanent magnet is preferably a rare earth magnet and is formed as a projection that extends through the central chamber of the housing in parallel with the axis of displacement. An electromagnetic coil, formed with an open passageway, is mounted on the piston and is positioned to partially surround the permanent magnet with the projection of the fixed-pole magnet extending through the passageway. An electrically conductive wire is wound repeatedly around the magnetic coil and application of electrical current to the wire creates a variable magnetic field within the housing.

The present invention also includes a hollow rod. The rod is positioned so that the longitudinal axis of the rod is oriented substantially in parallel with the axis of displacement of the actuator. The proximal end of the hollow rod passes through a pair of bearings located in the piston allowing the rod to be rotated around the rod's own longitudinal axis.

The present invention also includes an electric servo-motor with a rotatable output shaft. The servo-motor is connected to the piston and positioned so that the output shaft is aligned with the hollow rod. A flexible coupling connects the output shaft of the servo-motor to the proximal end of the hollow rod. As a result, the hollow rod may be selectively rotated within the bearings by application of electric current to the servo-motor.

Importantly, the cooperation between the hollow rod, bearings, servo-motor and flexible coupling allows the present invention to provide for rotational movement of components.

Additionally, the bearings prevent the hollow rod from moving translationally with respect to the piston even as the piston accelerates translationally. As a result, the rod is positively and accurately positioned by the translational movement of the piston. In addition, it may be appreciated that the bearings will absorb the forces associated with accelerating and decelerating the hollow rod and manipulator. In this fashion, these forces may be prevented from causing wear to other components of the actuator.

The distal end of the rod projects from the housing of the actuator and is connected to a manipulator. For one embodiment of the actuator, the manipulator may be operable to grasp the assembly component to be moved. In an alternate embodiment for the actuator, a vacuum source can be operatively connected with the rod to create a suction through the hollow rod that holds the assembly component against the manipulator during transport.

Operationally, the present invention provides three distinct modes whereby an assembly component may be moved or otherwise repositioned. For the first mode, a source of electrical current is connected to the windings of the electromagnetic coil. Electrical current from this source is passed through the coil as desired by the operator creating a variable magnetic field. The variable magnetic field interacts with the fixed magnetic field created by the permanent magnet creating a force on the electromagnetic coil. The force created by the interaction of the variable and fixed magnetic fields moves the electromagnetic coil, piston, servo-motor, hollow rod and manipulator relative to the housing. This movement allows assembly components to be repositioned translationally.

In the second mode of operation, an electric current under control of the operator is supplied to the servo-motor. The electric current causes the servo-motor to selectively rotate the servo-motor output shaft, flexible coupling, hollow rod and manipulator. The selective rotation allows the assembly component to be repositioned in rotation.

For the third mode of operation, the actuator itself can be moved in any manner well known in the art. It may be appreciated that the simultaneous and concerted action of the three modes combined with the ability of the manipulator to selectively grasp and release assembly components allows the present invention to provide a highly flexible system for transporting or otherwise repositioning assembly components.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
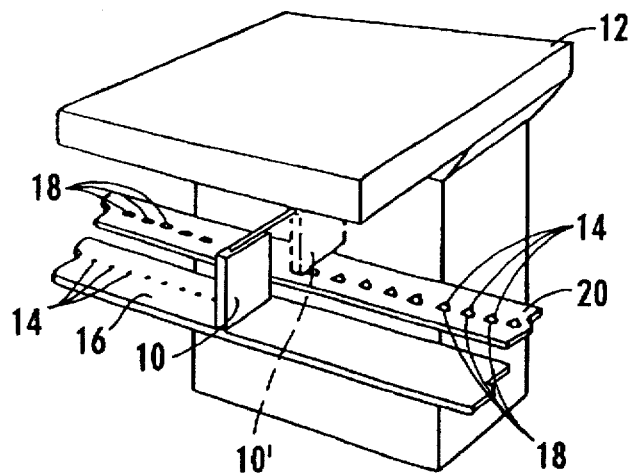
FIG. 1 is an isometric view of the present invention in its operative environment.

Referring initially to FIG. 1, the actuator device of the present invention, for moving and positioning an assembly component in an automated assembly operation, is shown in its intended environment and is designated 10. As shown, the actuator 10 is operatively mounted on an automated assembly machine 12 for movement between a position wherein the device (designated 10) retrieves a component 14 from a conveyor 16 and transports the component 14 to a position wherein the device (designated 10') places the component 14 into engagement with another end product component 18. After their assembly, the combination of components 14 and 18 is then taken by a conveyor 20 to a subsequent workstation where it is packaged or further combined with other components (not shown). As far as the actuator 10 and its operation is concerned, it is to be appreciated that the machine 12 shown in FIG. 1 is only exemplary. Indeed, the actuator 10 can be mounted on a variety of machines (not shown) for movement between a plurality of preselected positions.

Figure 2:
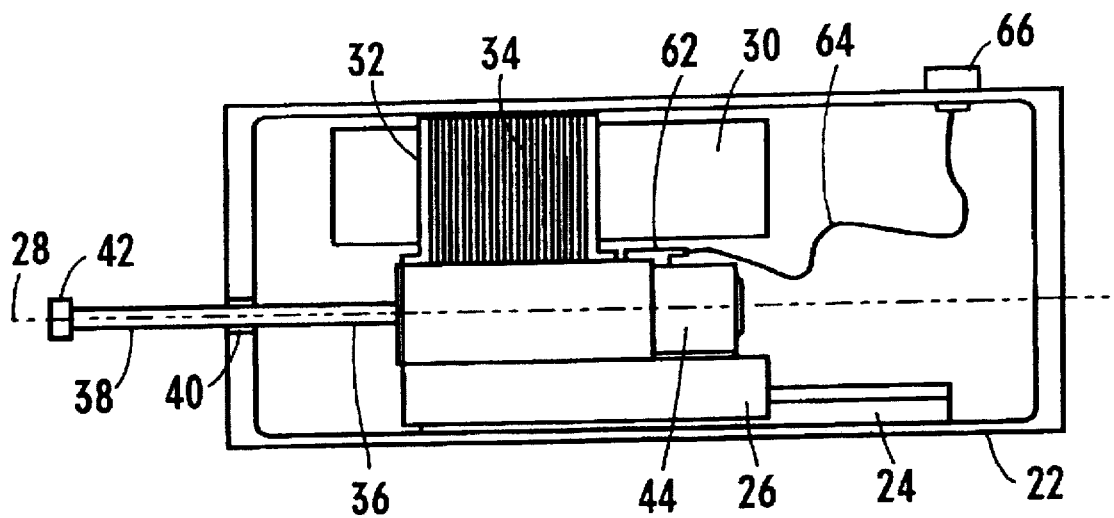
FIG. 2 is a side elevational view of the actuator of the present invention with portions removed to reveal the internal structure of the present invention.
Figure 3:
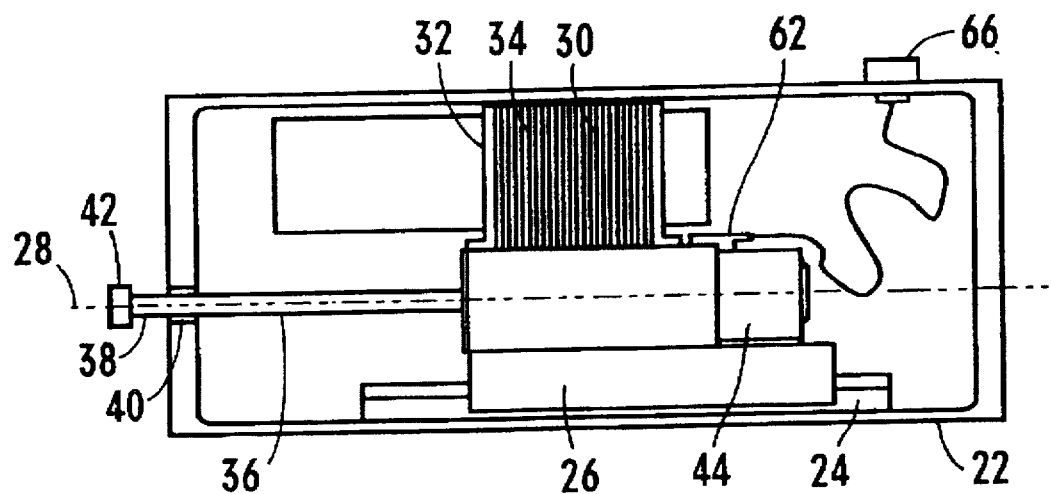
FIG. 3 is a side elevational view of the actuator of the present invention as shown in FIG. 2 with the manipulator of the present invention now shown in the retracted configuration.

The structure of the present invention may be better appreciated by reference to FIG. 2 where it may be seen that the actuator 10 includes a housing 22. A rail 24 is attached to the housing 22 and a piston 26 is slidingly mounted on the rail 24. The sliding mount of the piston 26 allows the piston 26 to move translationally within the housing 22 along the axis of displacement 28. A permanent magnet 30 is attached to the, housing 22. The permanent magnet 30 is shaped as a projection and is positioned to substantially parallel the axis of displacement 28.

A magnetic coil 32 is attached for translational movement with the piston 26. The magnetic coil 32 is formed around an opening through which the permanent magnet 30 is passed. An electrically conductive wire 34 is wrapped repeatedly around the coil 32. Preferably, the wire 34 is wrapped so that the path of the wire remains substantially perpendicular to the axis of displacement at all points on the wire 34.

A hollow rod 36 is also attached for translational movement with the piston 26. The rod 36 is positioned so that the longitudinal axis of the rod 36 is colinear with the axis of displacement 28. Additionally, the connection between the rod 36 and the piston 26 allows the rod 36 to be turned, or rotated, around the axis of displacement 28. The rod 36 has a distal end 38 and the distal end 38 projects from the housing 22 through an opening 40. A manipulator 42 is attached to the distal end 38 of the hollow rod 36. For the purposes of the present invention, it may be appreciated that the actual type of device used as manipulator 42 may vary. In general, the actual device chosen will depend largely on the operational role intended for actuator 10. Therefore, many different types of grasping devices may be suitable. In the case of the actuator 10 depicted in the Figures, a vacuum type manipulator is shown.

Figure 4:
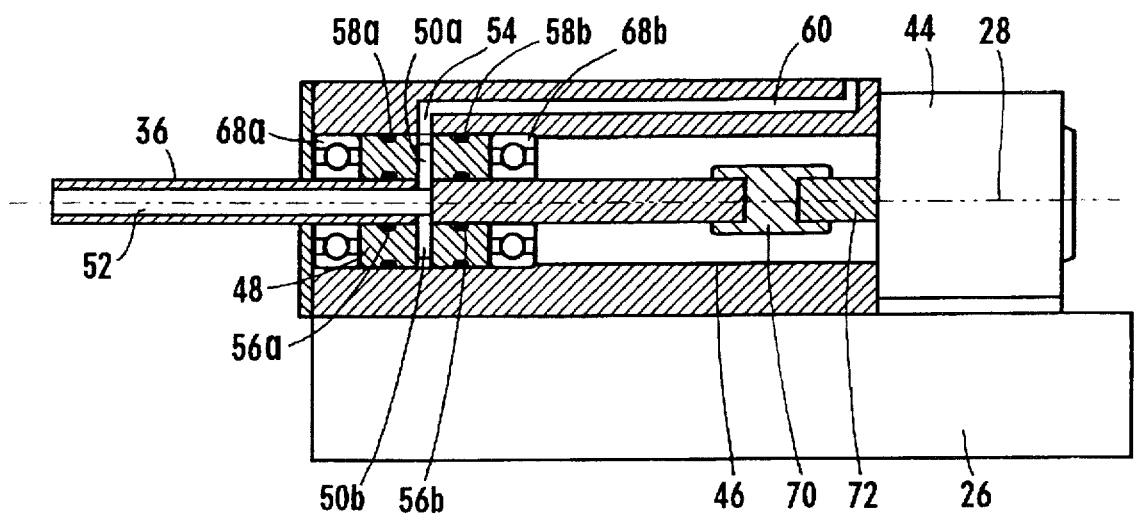
FIG. 4 is a partial cross-sectional view of the piston assembly of the present invention.

The present invention also includes an electric servo-motor 44 attached to the piston 26. The servo-motor 44 is operationally connected to the rod 36 allowing the servo-motor 44 to cause the rod 36 to rotate around the axis of displacement 28. The cooperation between the servo-motor 44 and the hollow rod 36 is better seen in FIG. 4. As seen in that figure, the hollow rod 36 passes through a bore 46 formed in the piston 26. Additionally, a cylindrical sleeve 48 is attached to surround a portion of the hollow rod 36. The cylindrical sleeve 48 is formed with a plurality of ports 50a, 50b each of which connect the lumen 52 of the hollow rod 36 to an annular groove 54 formed in the surface of the cylindrical sleeve 48. An air-tight seal is formed between the cylindrical sleeve 48 and the hollow rod 36 by two O-ring seals 56a and 56b. Similarly, an air-tight seal is maintained between the cylindrical sleeve 48 and the bore 46 by two more O-ring seals 58a and 58b. A vacuum port 60 passes through the piston 26 and connects to the bore 46 at the interface between the bore 46 and the annular groove 54 formed in the cylindrical sleeve 48. It should be appreciated that the connection between the lumen 52 of the hollow rod 36, ports 50a and 50b, annular groove 54 and vacuum port 60 provides a path of fluid communication between the vacuum port 60 and the lumen 52 and that a vacuum source (not shown) may be connected to the vacuum port 60 to establish a vacuum in lumen 52. In FIG. 2, it may be seen that an internal connector 62 is attached to the piston 26. Additionally, an external connector 66 is attached to housing 22 and a conduit 64 flexibly links the internal connector 62 and the external connector 66. In general, it may be appreciated that the combination of the internal connector 62, external connector 66 and conduit 64 provides a path whereby a vacuum source may be attached to vacuum port 60. Additionally, external connector 66 and conduit 64 provides an electrical path for electrical power and signals used by components attached to the piston 26 such as the electromagnetic coil 32 and the servo-motor 44.

On each side of the cylindrical sleeve 48, the hollow rod 36 is supported by a bearing 68a, 68b. The bearings 68a and 68b allow the hollow rod 36 to rotate around the axis of displacement 28 and simultaneously absorb thrust directed along the axis of displacement 28. In practice, varying bearing types may be used. For the purposes of the present invention, however, the bearings 68a and 68b are preferably of the ball, or roller, type.

The proximal end of the hollow rod 36 is attached to a flexible coupling 70 and the flexible coupling 70 is connected in turn to the output shaft 72 of the servo-motor 44. The flexible coupling 70 provides a mechanism whereby small errors in rotational alignment between the output shaft 72 and the hollow rod 36 may be attenuated. Therefore, the flexible coupling 70 is preferably fabricated from a material which has adequate rigidity to transmit the torque applied by the servo-motor 44 to the hollow rod 36 while still allowing a degree of rotational noncompliance between the output shaft 72 and the hollow rod 36.

OPERATION

A typical operational sequence for the actuator 10 begins by moving manipulator 42 translationally along the axis of displacement 28. To perform this function, an electric current, under control of an operator, is passed via the external connector 66, conduit 64, and internal connector 62 to the wire 34 wrapped around the electromagnetic coil 32. The current in the wire 34 causes the electromagnetic coil 32 to generate a variable magnetic field and the strength and polarity of the variable magnetic field is adjustable by appropriate alterations to the polarity and magnitude of the electric current applied to the external connector 66. The variable magnetic field interacts with the fixed magnetic field generated by the permanent magnet 30. As a result, a force is applied to the electromagnetic coil 32 and piston 26 to which the electromagnetic coil 32 is attached. The force applied by the electromagnetic coil 32 causes the piston 26 to move translationally along the axis of displacement 28 until the point of lowest potential energy is reached. For the purposes of the present invention, the initial electric current applied will preferably cause the translational movement of the piston 26 to bring the manipulator 42 into contact with an assembly component to be moved.

Once the manipulator 42 has contacted the assembly component to be moved, an external vacuum source may be applied via the external connector 66, conduit 64, and internal connector 62 to the vacuum port 60. As previously described, application of vacuum to the vacuum port 60 results in a low pressure, or vacuum, being created in the lumen 52 of the hollow rod 36. Additionally, a low pressure area is created at the manipulator 42 and the low pressure created at the manipulator 42 will tend to hold the assembly component in contact with the manipulator 42. In alternative embodiments of the present invention, different devices may be used for the manipulator 42 such as claws or other grasping devices. It may be easily appreciated that such devices may be constructed to be vacuum controllable and thus operable in cooperation with the basic structure provided by the present invention.

Once the assembly component has been grasped by the manipulator 42, it may be repositioned translationally along the axis of displacement 28 by applying a second electric current to the electromagnetic coil 32. This may be accomplished by following the same operational sequence described for the initial positioning of the manipulator 42. Additionally, a third electric current may be applied via the external connector 66, conduit 64, and internal connector 62 to the electric servo-motor 44 causing the output shaft 72 of the servo-motor 44 to selectively rotate. The rotation of the output shaft 72 is transferred by the flexible coupling 70 to the hollow rod 36 causing the manipulator 42 to turn, or rotate, around the axis of displacement 28. In addition to translational and rotational repositioning, the actuator 10 may itself be moved by any method well known in the art to reposition the assembly component according to a wide range of operational needs. It should be appreciated the various repositioning movements of the actuator 10 may be combined into a large number of operational sequences and any of the repositioning movements may be performed singularly or in concert. After the repositioning sequence has completed, the assembly component may be released from the manipulator 42 by increasing the pressure present in the manipulator 42 allowing the operational sequence of the actuator 10 to be resumed for another assembly component.

While the particular actuator for translational and rotary movement as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than described in the appended claims.

We claim:

1. A mechanism for precise translational positioning of a rotatable rod which comprises:

a base;

a piston mounted on said base for reciprocal linear motion thereon;

a rod having a proximal end and a distal end;

a motor with rotary drive shaft mounted on said piston;

a flexible coupling for connecting said drive shaft with said proximal end of said rod to bring said drive shaft into substantial coaxial alignment with said rod for rotation of said rod;

a proximal bearing having an inner race fixedly attached to said rod and an outer race mounted on said piston; and a distal bearing having an inner race fixedly attached to said rod and an outer race mounted on said piston, said distal bearing and said proximal bearing acting, in concert, to maintain axial orientation of said rod during rotation of said rod by said motor.

2. A mechanism as recited in claim 1 wherein said distal bearing and said proximal bearing are precision ball bearings.

3. A mechanism as recited in claim 1 wherein said distal bearing and said proximal bearing are precision roller bearings.

4. A mechanism as recited in claim 1 further comprising a sleeve mounted on said rod between said inner race of said proximal bearing and said inner race of said distal bearing.

5. A mechanism as recited in claim 4 wherein said sleeve includes sealing means for establishing a vacuum chamber between said sleeve and said piston.

6. A mechanism as recited in claim 5 wherein said sealing means comprises:

a first O-ring disposed in fluid tight engagement between said sleeve and said piston, said first O-ring being located between said outer race of said proximal bearing and said outer race of said distal bearing; and a second O-ring disposed in fluid tight engagement between said sleeve and said piston, said second O-ring being located between said outer race of said proximal bearing and said outer race of said distal bearing to create a chamber between said first O-ring, said second O-ring, said sleeve and said piston.

7. A mechanism as recited in claim 6 further comprising means for selectively creating a vacuum in said chamber.

8. A mechanism as recited in claim 7 wherein said rod is formed with an air passageway to establish fluid communication between said chamber and said distal end of said rod.

9. A mechanism for precise translational positioning of a rotatable rod which comprises:

a base;

a rod;

a piston mounted on said base for reciprocal motion thereon between a first position and a second position;

rotation means mounted on said piston for rotating a drive shaft;

connection means for flexibly coupling said rod in substantial coaxial alignment with said drive shaft to rotate said rod about an operational axis;

means interconnecting said rod with said piston for permitting rotation of said rod about said operational axis relative to said piston while maintaining axial orientation of said rod during rotation of said rod by said rotation means.

10. A mechanism as recited in claim 9 wherein said interconnecting means comprises:

a proximal roller bearing having an inner race fixedly attached to said rod and an outer race mounted on said piston; and a distal roller bearing having an inner race fixedly attached to said rod and an outer race mounted on said piston.

11. A mechanism as recited in claim 9 wherein said interconnecting means comprises:

a proximal bearing having an inner race fixedly attached to said rod and an outer race mounted on said piston; and a distal bearing having an inner race fixedly attached to said rod and an outer race mounted on said piston.

12. A mechanism as recited in claim 11 further comprising a sleeve mounted on said rod between said inner race of said proximal bearing and said inner race of said distal bearing.

13. A mechanism as recited in claim 12 further comprising:

a first O-ring disposed in fluid tight engagement between said sleeve and said piston, said first O-ring being located between said outer race of said proximal bearing and said outer race of said distal bearing; and a second O-ring disposed in fluid tight engagement between said sleeve and said base, said second O-ring being located between said outer race of said proximal bearing and said outer race of said distal bearing to create a chamber between said first O-ring, said second O-ring, said sleeve and said piston.

14. A mechanism as recited in claim 13 further comprising means for selectively creating a vacuum in said chamber.

15. A mechanism as recited in claim 14 wherein said rod is formed with an air passageway to establish fluid communication between said chamber and said distal end of said rod.

* * * * *

UNITED STATES PATENT AND TRADEMARK OFFICE
CERTIFICATE OF CORRECTION

PATENT NO. : 5,685,214

DATED : November 11, 1997

INVENTOR(S) : Edward A. Neff, Hans Portegies

It is certified that error appears in the above-identified patent and that said Letters Patent is hereby corrected as shown below:

TITLE PAGE, ITEM [75]:

In the "Inventors" section, the name "Porteguise" should be deleted and the name "Portegies" substituted therefore.

Signed and Sealed this

Seventh Day of July, 1998

*Attest:*

BRUCE LEHMAN

*Attesting Officer*  *Commissioner of Patents and Trademarks*